United States Patent Office.

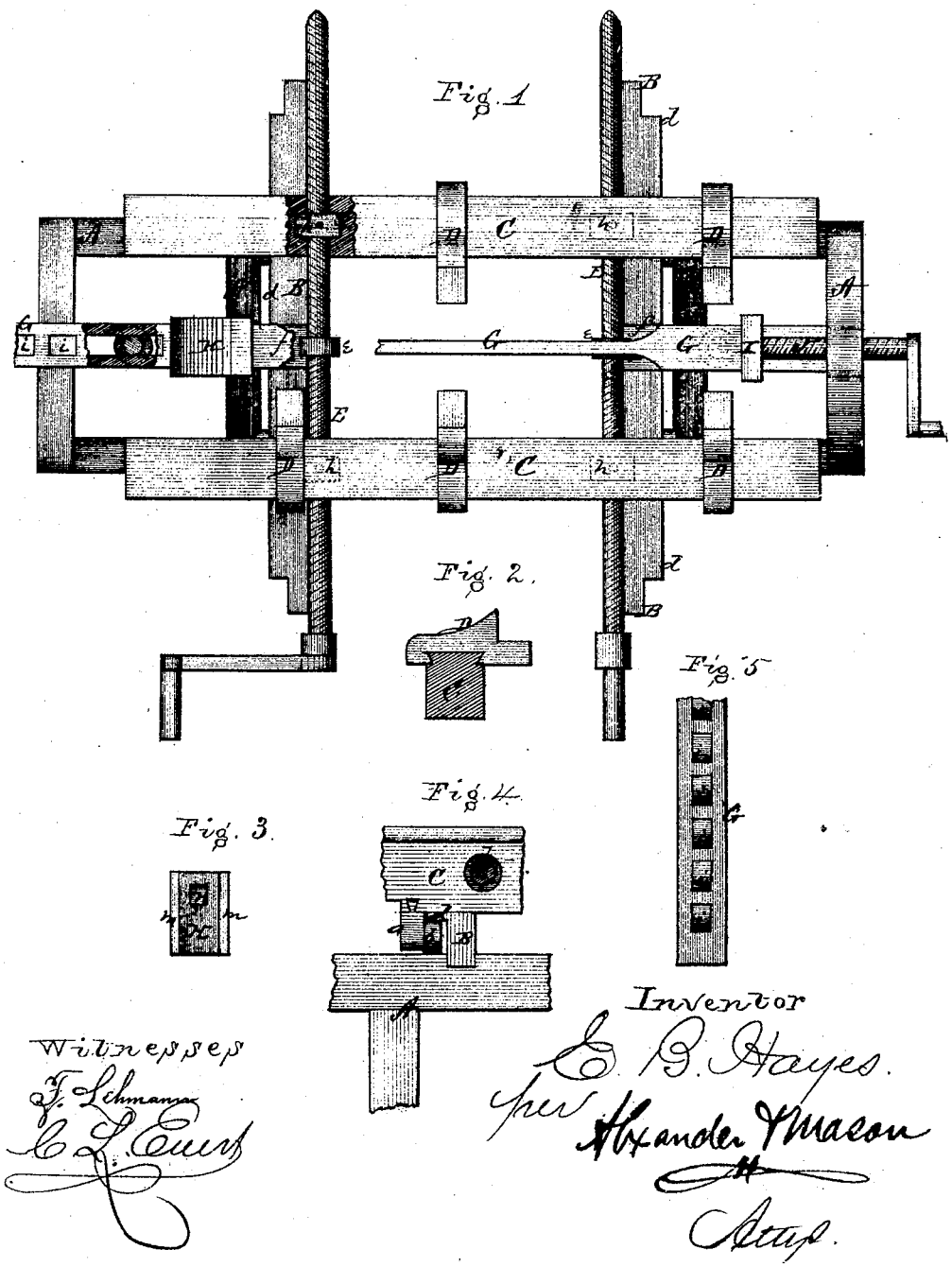

E. B. HAYES, OF VERGENNES, VERMONT.

Letters Patent No. 101,126, dated March 22, 1870.

IMPROVEMENT IN CLAMPS.

The Schedule referred to in these Letters Patent and making part of the same.

*To all whom it may concern:*

Be it known that I, E. B. HAYES, of Vergennes, in the county of Addison, and in the State of Vermont, have invented certain new and useful Improvements in Joiner's Clamps; and do hereby declare that the following is a full, clear, and exact description thereof, reference being had to the accompanying drawings and to the letters of reference marked thereon making a part of this specification.

My invention relates to a "joiner's clamp," for squeezing doors, &c., and consists First, in the construction and arrangement of certain arms and rollers that hold the large jaws down while being pressed together, thereby securing equal pressure on the upper and lower edge of the door;

Second, in the application of reversed screws, which bring both jaws together at the center, so as to leave the end screw always in the center;

Third, in the application of swivel-nuts on the long screws, which allow one screw to be turned more than the other without bending;

Fourth, in the construction and arrangement of the clamps that slide on the large jaws; and Fifth, in the construction and arrangement of the extension clamp that goes lengthwise of the machine.

In order to enable others skilled in the art to which my invention appertains to make and use the same, I will now proceed to describe its construction and operation, referring to the annexed drawings, in which—

Figure 1 is a plan view of the entire machine, portions of the same being in sections;

Figure 2 is a vertical cross-section of one of the large jaws, showing the manner in which the clamps are put on;

Figure 3 is a bottom view of the clamp that goes lengthwise in the machine;

Figure 5 is a plan view of the bar upon which the clamp, fig. 3, is placed, making the same an extension clamp; and Figure 4 is a side view of a portion of one of the jaws, showing the arm and roller which holds the same.

A represents the frame of my machine, made of any shape and dimensions desired.

Across the frame A are placed two bars, B B, forming tracks upon which the jaws C C move, said jaws being provided with arms $a$ $a$.

At the lower end, on one side of the arm $a$, is a wheel or roller, $b$, which bears against the under side of a flange, $d$, projecting from the side of the bar B, as shown in figs. 1 and 4; or this roller $b$ may bear against the under side of the bar B, dispensing with the flange $d$, in which case the frame A has to be suitably cut out to allow the arm and roller free play alongside of the bar B.

The jaws C C are grooved longitudinally on both sides, near the top, or rather cut beveled, so as to make a dove-tail with the clamps D D, as seen in fig. 2, the clamps sliding on the jaws.

These jaws are moved to or from each other by means of two reversed screws E E, which pass through both jaws, and are provided with a collar, $e$, each in the center, which are held by the forked bars $f$ $f$, so as to prevent any side motion of the screws. By turning these screws the jaws are brought together more or less, as may be desired, to press the door which rests upon the clamps.

Within the jaws C C are placed swivel-nuts $h$ $h$, through which the screws E E pass, so that if one screw should be, or have to be, turned more than the other, the nuts will turn on their pivots and accommodate themselves to the position of the jaws, preventing the bending of the screws.

In the center of the machine, and running lengthwise in the same, is a rod or bar, G, which is flattened or enlarged at both ends, as shown in fig. 1.

One of these enlargements of the bar G has on its upper side a series of recesses, $i$ $i$, which are beveled from the outer end upward, toward the inner end, the outer side of each recess being perpendicular, or nearly so.

On this portion of the bar G is placed the clamp H, having flanges $m$ $m$ on both sides, which project downward on the sides of the bar G, preventing any lateral motion of the clamp.

On the under side of the clamp is a beveled projection, $n$, which fits in any one of the recesses $i$ on the bar G, to hold the clamp firmly.

At the other end of the machine a screw, J, passes through the frame A, said screw being at its inner end provided with a clamp or follower, I, which rests upon the flattened enlargement of the bar G, at this end.

By turning the screw J the clamp I is moved so as to compress the door lengthwise.

Having thus fully described my invention,

What I claim as new, and desire to secure by Letters Patent, is—

1. The combination of the reversible screws E E, clamps C C, and swivel-nuts $h$ $h$, all substantially as and for the purpose set forth.

2. The arrangement of the frame A, bars B B, arms $a$, with rollers $b$, clamps C C, screws E E, nuts $h$, recessed bar G, and clamp H, all the parts being constructed and operated substantially as set forth.

In testimony that I claim the foregoing, I have hereunto set my hand and seal this 29th day of December, 1869.

E. B. HAYES. [L. S.]

Witnesses:
    J. H. LUCIA,
    GEO. F. SKIFF.